UNITED STATES PATENT OFFICE.

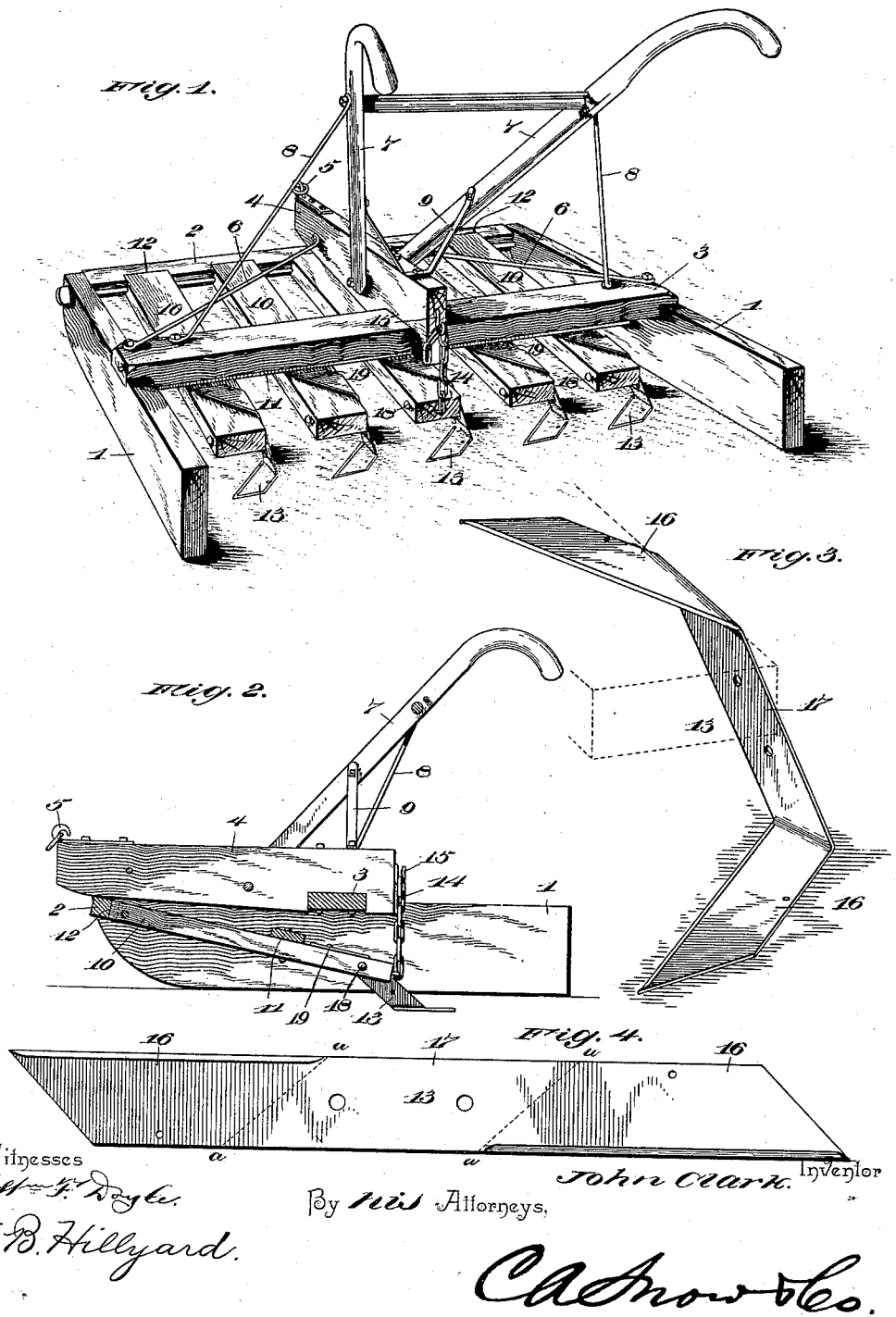

JOHN CLARK, OF OSSEO, WISCONSIN.

SUGAR-BEET SPACER AND BUNCHER.

SPECIFICATION forming part of Letters Patent No. 612,894, dated October 25, 1898.

Application filed October 7, 1897. Serial No. 654,482. (No model.)

*To all whom it may concern:*

Be it known that I, JOHN CLARK, a citizen of the United States, residing at Osseo, in the county of Trempealeau and State of Wisconsin, have invented a new and useful labor-saving machine to be used in the cultivation of the sugar-beet as a spacer and buncher preparatory to the thinning process by being propelled across the rows, of which the following is a specification.

This invention has relation to an implement for properly spacing and bunching sugar-beets after the plants have acquired the requisite growth. This operation is generally performed by hand, which adds materially to the cost of the crop.

By the present invention the hand-hoeing resorted to for thinning and spacing the rows of plants is obviated and the bunches are uniformly spaced, the soil at the same time being loosened and lightened, whereby an increased crop results.

The implement in its organization comprises a frame to which the draft is applied, a series of longitudinally-disposed bars having pivotal connection at their front ends with the frame, cutters applied to the rear ends of the bars, and means for raising and lowering the rear ends of the bars to regulate the depth to which the cutters may penetrate the soil.

The improvement, aside from the general construction of the machine, consists in the peculiar formation of the cutters, which are constructed of strips of sheet-steel or other suitable metal, having their end portions bent upon oblique lines at different distances from the extremities of the strips, whereby blades of different lengths are provided, so that the spaces between the bunches may be regulated by bringing one or the other of the ends of the cutters into operative position.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of an implement for attaining the objects of this invention. Fig. 2 is a longitudinal section. Fig. 3 is a detail view in perspective of a cutter. Fig. 4 is a plan view of a blank from which the cutter is formed, the dotted lines showing where the end portions of the blank are bent to provide the blades.

Corresponding and like parts are referred to in the following description and indicated in the several views of the drawings by the same reference characters.

The main frame comprises longitudinal beams 1, transverse beams 2 and 3, and an intermediate draft-beam 4, secured at its ends to the transverse beams 2 and 3, and provided at its front end with a draft-iron 5, to which the animal is hitched for drawing the implement over the field. Braces 6 are interposed between the front end portion of the draft-beam and the extremities of the transverse beam 3 and serve to stiffen and strengthen the frame and prevent any lateral displacement of the draft-beam when turning the implement. The longitudinal beams 1 constitute runners upon which the implement glides when drawn over the ground. The handles 7 are secured at their lower ends to the draft-beam and are strengthened by side braces 8 and an intermediate V-shaped brace 9.

A series of bars 10 are spaced apart and disposed in parallel relation with one another and with the beams 1. These bars are connected near their rear ends by a cross-bar 11 and have their front ends entering notches 12, formed in the rear edge of the transverse beam 2, by means of which said bars are maintained a proper distance apart at their front ends. The cutters 13 are applied to the rear ends of the bars 10 and are adjustable vertically by moving the rear ends of said bars vertically. An adjustable connection is interposed between the series of bars 10 and the rear portion of the draft-beam, and, as shown, this connection consists of a chain 14, secured at its lower end to the rear extremity of an intermediate bar 10, a hook 15 being applied to the rear end of the draft-beam and adapted to have any one of the links of the chain engage therewith, so as to hold the rear ends of the bars 10 at the required elevation.

As most clearly indicated in Fig. 4, the cutters are formed from blanks which consist of strips of sheet-steel or other suitable metal of proper length, width, and thickness, said strips or blanks having their end portions bent upon oblique lines $a\ a$ at different distances from the extremities of the strips, forming blades 16 and an intermediate shank 17. Each of the cutters is placed with the upper portion of its shank against the edge of its bar 10 and with the upper blade overlapping said bar, a bolt 18 passing through an opening in the shank and transversely through the bar 10, and screws or like fastenings 19 passing through openings in the uppermost blades and into the bar. When in position, the shank portions 17 of the cutters incline rearwardly and the lowermost blades extend laterally and rearwardly and the uppermost blades laterally and forwardly. The blades, as it is obvious, operate by a shear action and run beneath the surface of the soil, the distance being regulated by lengthening or shortening the adjustable connection 14. Inasmuch as the blades are of different lengths it is obvious that by reversing the cutters so as to bring one or the other set of blades into active position the distance between the bunches can be varied.

The seeds are planted in parallel rows, and when the plants have acquired the desired growth they are thinned, so as to space the bunches, by drawing the implement over the field in a direction at right angles to the rows. The length of the blades governs the spaces between the bunches, and as the implement in drawn crosswise of the field or at right angles to the rows of plants the blades will thin the rows by cutting down the plants with which they come in contact.

Having thus described the invention, what is claimed as new, and desired to be secured by Letters Patent, is—

1. In an implement for the purpose specified, the combination of longitudinal and transverse beams rigidly connected forming a substantial frame, a connected series of longitudinal bars pivotally attached at their front ends to the forward portion of the frame and provided at their rear ends with cutters, a draft-beam rigidly secured to the transverse beams at an intermediate point, braces between the forward portion of the draft-beam and the longitudinal beams of the frame mutually staying each, and an adjustable connection between the rear portion of the draft-beam and an intermediate longitudinal bar, substantially as and for the purpose described.

2. In an implement for the purpose specified, the combination of longitudinal and transverse beams rigidly connected forming a substantial runner-frame, the forward transverse beam having a series of notches in its rear edge, a connected series of longitudinal bars having their front ends entering the notches of the forward transverse beam and pivotally connected with the runner-frame and having cutters at their rear ends, a draft-beam rigidly secured to the transverse beams of the runner-frame at an intermediate point, handles applied to the draft-beam, braces between the side portions of the runner-frame and the draft-beam and handles, and an adjustable connection between an intermediate longitudinal bar and the draft-beam, substantially as and for the purpose set forth.

3. A cutter for the purpose specified, comprising a strip having its end portions bent upon oblique lines forming blades which incline relatively in opposite directions from the central portion of the strip to project forwardly and rearwardly, substantially as set forth.

4. A cutter for the purpose described, comprising a strip having its end portions bent upon oblique lines and at different distances from the extremities of the strip forming blades of unequal length and extending in opposite directions from the central portion of the strip to project forwardly and rearwardly, substantially as specified.

5. The combination with a bar, of a cutter formed of a strip having its end portions bent upon oblique lines at different distances from the extremities of the strip forming blades of unequal length, and an intermediate shank, said cutter being placed with the shank against the edge of the bar and with one of the blades overlapping the bar, substantially as described.

JOHN CLARK.

Witnesses:
G. O. LINDERMAN,
H. H. FIELD.